United States Patent
Hiesener et al.

(12) 
(10) Patent No.: US 6,273,365 B1
(45) Date of Patent: Aug. 14, 2001

(54) STORAGE COMPARTMENT AND VENTING CHANNEL COMBINATION IN AN AIRCRAFT CABIN

(75) Inventors: Stefan Hiesener, Buxtehude; Joern Duering, Hamburg; Dieter Kasch, Buxtehude, all of (DE)

(73) Assignee: DaimlerChrysler Aerospace Airbus GmbH, Hamburg (DE)

( * ) Notice: Subject to any disclaimer, the term of this patent is extended or adjusted under 35 U.S.C. 154(b) by 0 days.

(21) Appl. No.: 09/523,422

(22) Filed: Mar. 10, 2000

(30) Foreign Application Priority Data

Mar. 11, 1999 (DE) .............................................. 199 10 779

(51) Int. Cl.$^7$ ...................................................... B64D 11/00
(52) U.S. Cl. .................................. 244/118.1; 244/118.5; 244/129.1; 317/237
(58) Field of Search ............................ 244/117 R, 118.5, 244/129.1, 121, 118.1, 119; 459/69, 71, 7 C; 312/237

(56) References Cited

U.S. PATENT DOCUMENTS

| | | | |
|---|---|---|---|
| 4,033,247 | * | 7/1977 | Murphy .............................. 244/129.1 |
| 4,383,666 | * | 5/1983 | Allerding et al. ................. 244/118.5 |
| 5,118,053 | * | 6/1992 | Singh et al. ........................ 244/118.5 |
| 6,129,312 | * | 10/2000 | Weber ................................ 244/118.5 |

* cited by examiner

Primary Examiner—Galen L. Barefoot
(74) Attorney, Agent, or Firm—W. F. Fasse; W. G. Fasse

(57) ABSTRACT

A storage compartment is combined with an air flow channel (5) between a passenger seat and an aircraft side wall in an aircraft cabin. The storage compartment is constructed of five walls forming a box (3) inserted into the air channel that extends longitudinally along the aircraft side wall and along the cabin floor. The box (3) is upwardly closed by a hinged cover (16) forming a tray (17). The aircraft side wall (2) has at least one air filter element (10) facing into the channel. One or more dado panels (7) with air flow passages (6) enclose the channel toward the cabin. A cabin floor (4) closes the channel (5) downwardly. One or more decompression flaps (15) in the floor (4) normally close the channel (5). Under normal operating conditions air flow into and out of the cabin passes around the box through the channel (5) and the filter element (10). Should a decompression occur the flap (15) is opened and pressure equalization is achieved by air flow through the openings in the cabin floor thereby bypassing the air filter element (10) for rapid pressure equalization in different spaces of the aircraft.

14 Claims, 1 Drawing Sheet

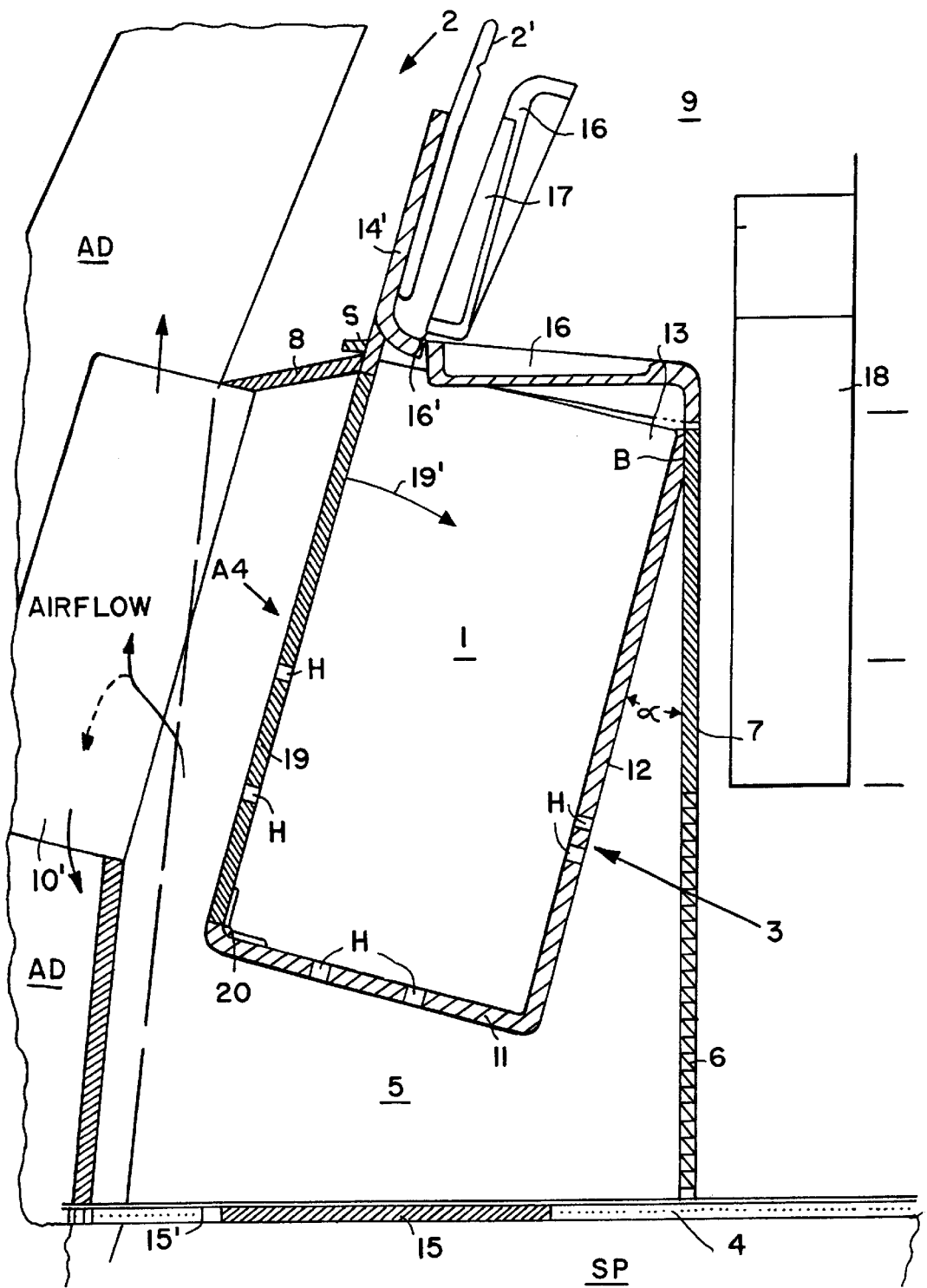

STORAGE COMPARTMENT AND VENTING CHANNEL COMBINATION IN AN AIRCRAFT CABIN

PRIORITY CLAIM

This application is based on and claims the priority under 35 U.S.C. §119 of German Patent Application 199 10 779.3, filed on Mar. 11, 1999, the entire disclosure of which is incorporated herein by reference.

FIELD OF THE INVENTION

The invention relates to a storage compartment and venting channel combination arranged in an aircraft cabin between a passenger seat and a side wall of the aircraft in the vicinity of the cabin floor.

BACKGROUND INFORMATION

It is generally known to arrange storage compartments on the floor of an aircraft cabin next to passenger seats. Such compartments are provided, for example, on the upper deck of the Boeing passenger aircraft B 747.

It is also generally known to provide ventilation air channels in aircraft cabins for supplying fresh air or venting exhaust air, through air vents or openings on each deck. The cross-sectional flow area of these openings is too small, however, to provide an adequate pressure equalization in the case of an explosive pressure drop or decompression. For this reason, dado panels with decompression flaps are arranged in almost all aircraft that have pressurized cabins. These panels provide with their normally covered openings or air vents a larger cross-sectional flow area between the decks of an aircraft in case of an explosive decompression, thereby ensuring a rapid pressure equalization between the decks.

U. S. Pat. 4,383,666 (Allerding et al.) discloses a safety mechanism for aircraft having separate cabins on separate decks separated by an intermediate cabin floor. The cabins are pressurized during flight at high altitudes. Air passages that allow air flow between the upper and lower cabins are arranged in peripheral areas in the upper cabin floor. These air passages are enclosed on the upper floor with panels or covers provided with air vents. The panels are fixed in their respective positions by a self-actuating locking mechanism. Each of the panels comprises two pivotable or tiltable flaps with a space between the flaps. The flaps are movable relative to each other. The outer flap faces the air passage in the cabin floor and the inner flap faces the upper cabin. The outer flap is constructed as a self-actuating releasable rigid locking mechanism for releasing the inner flap from its locked position during a suddenly occurring pressure drop, allowing both flaps of a panel to fold back toward the outer wall of the aircraft, thereby allowing free passage of air between the upper and the lower cabins. There is room for improvement because conventional structures do not efficiently use the available space near the cabin floor especially next to the curved cabin wall.

OBJECTS OF THE INVENTION

In view of the foregoing it is the aim of the invention to achieve the following objects singly or in combination:

- to provide storage compartments in an aircraft cabin next to a passenger's seat so that the compartments are easily accessible for a seated passenger;
- to position such storage compartments within an air flow channel between a passenger seat and the cabin side wall on the cabin floor for a more efficient space utilization;
- to ensure a proper ventilation of upper and lower aircraft cabins and a rapid pressure equalization between the cabins in response to a decompression in any one of the cabins; and
- to position the storage compartment in the air flow in such a way that an unacceptable air flow restriction is avoided.

SUMMARY OF THE INVENTION

The above objects have been achieved by arranging a storage compartment within an air channel that runs along the cabin floor in the longitudinal direction of an aircraft. The air channel is bounded on its outer side away from a seat by an aircraft cabin wall, on the bottom by the cabin floor, on the inner side facing a seat by one or more dado panels having flow openings or air vents, and on the upper side by an upper cover panel or molding. One or more decompression flaps are arranged in the cabin floor within the area covered by the air channel. These flaps normally close air flow passages. The air vents are preferably positioned in the lower portion of the dado panels. At least one air filter element is arranged in the side wall of the aircraft within the area of the air channel which communicates through the filter with an air duct in the cabin wall, or the airflow through the filter element is driven by a pressure difference independently of an outer air duct.

During normal ventilation, fresh air flows into the cabin through the air filter element, through air vents in the dado panels of the air channel and, if desired also through air vent holes in the storage compartment. Exhaust or used air flows out of the cabin by reversing the direction of air flow. During an explosive pressure drop in one of the cabins, it is important to equalize the pressure in the upper and lower cabins as rapidly as possible. In such a case, the decompression flaps in the cabin floor open, providing a larger flow cross-sectional area through air flow passages in the floor than is provided by the smaller air vents in the dado panels. The decompression flaps open to the pressure drop side and air flows directly from the high-pressure cabin through the air channel and through the air flow passages in the floor to the low-pressure cabin without flowing through the air filter element. This feature ensures rapid equalization of the pressure between the upper and lower cabins by bypassing the filter elements.

An essential advantage of the invention lies in the fact that air flows through the air filter elements during normal ventilation of the cabin, but bypasses the air filter elements and flows through the air flow passages in the floor and past the now open decompression flaps in response to an explosive decompression. A further advantage is that the air filter elements are easily accessible through the maintenance flaps provided in the storage compartment according to the invention. In the embodiment with compartments constructed as inserts, these inserts are easily removed from the air channel for servicing the filter element. In both instances maintenance is simple, requires a minimum of time, and allows the air filter elements to be replaced quickly. Further advantages of the invention are the ability to store and secure passenger articles in a readily and comfortably accessible space that is otherwise wasted and in that a compartment cover provides a tray for small articles.

BRIEF DESCRIPTION OF THE DRAWINGS

In order that the invention may be clearly understood, it will now be described in connection with an example embodiment, with reference to the accompanying single drawing, which shows an elevational cross sectional view of a storage compartment according to the invention, arranged in an air channel between a passenger seat and an aircraft side wall.

DETAILED DESCRIPTION OF PREFERRED EXAMPLE EMBODIMENTS AND OF THE BEST MODE OF THE INVENTION

The present storage compartment 1 is constructed of five compartment walls and a cover 16. The compartment walls include a bottom 11, two longitudinal side walls 12, 14 and two end walls 13 that form a substantially right-parallelepiped hollow box 3. The hollow box 3 is arranged within an upper portion of an air channel 5 and extends in the longitudinal direction of the aircraft, substantially parallel to a side wall 2 of the aircraft, particularly a curved aircraft side wall. A maintenance flap 19 is arranged in the outer compartment side wall 14 to allow easy access to an air filter element 10 in an aircraft side wall 2.

Preferably, the entire outer side wall 14 is formed as a maintenance flap 19 that tilts inwardly as indicated by an arrow 19' for easy access to the filter element 10 through the top opening of the compartment. The compartment walls may preferably include air holes H for allowing an air flow through the compartment 1. An access opening surrounded by the upper edges of the compartment side walls 12 and 14 and by the upper edges of the end walls 13 provides access to the storage compartment 1.

A compartment cover 16 is attached to the upper part of the storage compartment by a hinge 16'. The cover 16 is shown in section in its position closing the storage compartment. The open or raised cover position is shown not in section. The cover 16 is preferably formed as a tray 17 that can be used by the passenger.

Further, the air channel 5 is arranged between a passenger seat 18 and the aircraft side wall 2 on a cabin floor 4 to take advantage of the curvature of the side wall 2. Due to this curvature the vertical clearance next to the wall is too small for placing the seat 18 directly next to the wall. However, the space is sufficient for the air channel 5 and the compartment 1, without unpermissably restricting any air flow, yet providing an easily and comfortably accessible storage space next to the seat 18.

As can be seen in the Figure, the storage compartment opening is positioned in the area of an upper cover plate 8 of the air channel 5 in close proximity to the passenger seat 18. The hinge 16' of the cover 16 is positioned just above the cover panel 8. The hinge 16' is secured to an extension 14' of the side wall 14 of the storage compartment 1. The wall extension 14' is preferably provided with a handle 2' for lifting the entire compartment 1 out of the air channel 5 or inserting the compartment.

The storage compartment 1 is preferably arranged at a predetermined angle a relative to α vertical plane of an aircraft cabin 9, as shown in the Figure. The angle α is so selected that the compartment side walls 12 and 14 do not interfere with a proper air flow through the channel 5, through the filter element 10 and through air passages 6 in a dado panel 7 of the air channels 5. The angular position of the compartment 1 also makes it easier and more comfortable for a passenger to reach into the storage compartment 1.

The air suction channel 5 is enclosed on the cabin side by one or more of the above mentioned dado panels 7. The air passages 6 through the dado panels 7 are preferably positioned in a lower portion of the dado panel or panels 7. An upper side of the channel 5 facing the aircraft cabin 9 is only partly closed by the upper cover panel 8 to provide the above mentioned opening for the box 3. An outer side of the channel 5 is closed by the aircraft side wall 2 holding at least one air filter element 10 arranged to communicate with the air channel 5 and with an air duct AD in the wall 2. AD can duct the air upwards or downwards, but is not necessary if a pressure difference is applied to the filter. The bottom of the air channel 5 is closed by the cabin floor 4 provided with openings normally closed by decompression flaps 15 hinged to the cabin floor 4 by hinges 15' that permit the flap 15 to open upwardly in response to decompression in the upper cabin 9 and downwardly in response to decompression in a lower space SP such as a lower cabin.

The outer compartment wall 14 of the storage compartment 1 extends adjacent to but spaced from the aircraft side wall 2 to permit an unrestricted air flow through the air channel 5. The maintenance flap 19 is hinged to the bottom wall 11 by a hinge 20 as shown in the Figure. Hinging of the flap 19 to one of the end walls 13 may be possible in an alternative embodiment.

During normal exhaust ventilation, the air flows from the aircraft cabin 9 through the air flow passages 6 in the dado panels 7, along the storage compartment walls 11, 12 and 14, and through the air filter element 10. During air supply to the cabin, the air flows in the opposite direction.

When an explosive pressure loss occurs, the decompression flaps 15 open up or down, depending on whether the location of the leak causing the pressure loss is in the upper or lower part of the aircraft body. For example, when the explosive pressure drop occurs in the upper cabin, the decompression flaps 15 open upwardly and the air then passes directly from the lower space SP through the floor opening or openings normally closed by the decompression flaps 15 and through the air passages 6 of the dado panels 7 into the upper cabin 9. When the explosive pressure drop occurs in the lower space SP, the air flows in the opposite direction, i.e., out of the upper cabin 9, through the air passages 6, and through floor openings into the lower space Sp. For pressure equalization the air does not flow through the air filter elements 10, but flows directly from one cabin to the other bypassing the filters.

Preferably, the box 3 is constructed as an insert with the above mentioned handle 2', whereby the compartment can be easily pulled out of the air flow channel 5 for maintenance or replacement work of the filter element 10. Upon completion of the work the compartment is simply reinserted into the air flow channel 5, whereby at least one stop member S makes sure that the compartment assumes the proper position in the channel 5. A bevel B at the top edge of the side wall 12 contacts the dado panel 7 to assure the proper angular position of the compartment in the channel 5. The slant of the bevel B determines the angle α.

Although the invention has been described with reference to a specific example embodiment, it will be appreciated that it is intended to cover all modifications and equivalents within the scope of the appended claims. It should also be understood that the present disclosure includes all possible combinations of any individual features recited in any of the appended claims.

What is claimed is:

1. A combination comprising an aircraft cabin including a cabin wall (2) and a cabin floor (4), an air duct (AD) in said cabin wall, a dado panel (7) having at least one air flow passage (6), said dado panel enclosing an air channel (5) with said cabin wall (2) and with said cabin floor (4), said air channel (5) having an upwardly facing channel opening, a cover plate (8) closing part of said channel opening along said cabin wall (2), an air filter (10) in said cabin wall between said air duct (AD) and said air channel (5), a compartment (1) in said air channel (5) for holding small articles, said compartment (1) having compartment walls (11, 12, 13, 14) spaced from said cabin wall (2), from said cabin floor (4), and from said dado panel (7) for a free air flow through said air channel (5), said compartment walls forming an upwardly facing compartment access opening into said compartment, in said cabin floor at least one pressure equalization passage leading into said air channel (5), at least one decompression responsive flap (15) hinged (15') to said floor (4) normally closing said pressure equalization passage, wherein under normal operating conditions cabin air passes through said air channel (5) and through said filter (10), and any pressure equalization air flows through said pressure equalization passage bypassing said filter (10).

2. The combination of claim 1, wherein said upwardly facing compartment access opening is positioned next to a passenger seat (18) in said aircraft cabin.

3. The combination of claim 1, further comprising a hinged cover (16) for closing said compartment access opening.

4. The combination of claim 3, wherein said hinged cover (16) forms a tray (17).

5. The combination according to claim 1, wherein said compartment walls comprise at least one wall (14) facing said cabin wall (2) and said filter (10), and wherein at least a wall portion (19) of said at least one wall (14) is movable into a position for access to said filter.

6. The combination of claim 5, further comprising a hinge (20) connecting at least said wall portion (19) so that said wall portion is tiltable out of the way for access to said filter.

7. The combination of claim 5, wherein said at least one wall (14) is movable out of the way for access to said filter.

8. The combination of claim 1, wherein said compartment is mounted in said air channel (5) at a slanting angle ($\alpha$) to a vertical plane extending longitudinally through said aircraft cabin.

9. The combination of claim 8, wherein said compartment walls comprise a side wall (12) facing said dado panel (7) and wherein said slanting angle ($\alpha$) is enclosed between said side wall (12) and said dado panel (7).

10. The combination of claim 9, wherein said compartment side wall (12) comprises an upper edge with a bevel (B) facing said dado panel (7), said bevel (B) having a slant determining said angle ($\alpha$).

11. The combination of claim 1, wherein at least one of said compartment walls has vent holes (H) therein.

12. The combination of claim 1, wherein said compartment walls form an insert box (3) for insertion into and withdrawal from said air channel (5).

13. The combination of claim 12, wherein said insert box (3) comprises a handle (2') for inserting or withdrawing said insert box (3) into or out of said air channel (5).

14. The combination of claim 12, comprises at least one stop (S) positioned for limiting an insertion depth of said insert in said air channel.

\* \* \* \* \*